(12) United States Patent
Wooley

(10) Patent No.: US 12,472,594 B1
(45) Date of Patent: Nov. 18, 2025

(54) CLAMP TOOL AND METHOD FOR MANIPULATING A SLIDE COLLAR PTO YOKE

(71) Applicant: Waymon Foy Wooley, Conroe, TX (US)

(72) Inventor: Waymon Foy Wooley, Conroe, TX (US)

( * ) Notice: Subject to any disclaimer, the term of this patent is extended or adjusted under 35 U.S.C. 154(b) by 0 days.

(21) Appl. No.: 19/221,708

(22) Filed: May 29, 2025

Related U.S. Application Data

(60) Provisional application No. 63/657,390, filed on Jun. 7, 2024.

(51) Int. Cl.
| | |
|---|---|
| *B25B 27/14* | (2006.01) |
| *B23P 19/04* | (2006.01) |
| *B25B 7/02* | (2006.01) |
| B25B 7/12 | (2006.01) |
| B25B 27/00 | (2006.01) |

(52) U.S. Cl.
CPC .............. *B23P 19/047* (2013.01); *B25B 7/02* (2013.01); *B25B 27/146* (2013.01); *B25B 7/123* (2013.01); *B25B 27/0092* (2013.01); *Y10T 29/53604* (2015.01); *Y10T 29/5363* (2015.01); *Y10T 29/53683* (2015.01); *Y10T 29/539* (2015.01); *Y10T 29/53987* (2015.01); *Y10T 29/53991* (2015.01); *Y10T 29/54* (2015.01)

(58) Field of Classification Search
CPC .. B25B 7/123; B25B 7/02; B25B 7/20; B25B 27/0092; B25B 27/146; Y10T 29/53604; Y10T 29/5363; Y10T 29/53683; Y10T 29/539; Y10T 29/53913; Y10T 29/53987; Y10T 29/53991; Y10T 29/54
See application file for complete search history.

(56) References Cited

U.S. PATENT DOCUMENTS

| | | | | |
|---|---|---|---|---|
| 1,157,082 | A * | 10/1915 | Campbell | B25B 27/12 29/223 |
| 1,475,665 | A * | 11/1923 | Wakefield | B25B 27/12 29/223 |
| 1,589,392 | A * | 6/1926 | Hiatt | B25B 27/12 29/223 |
| 1,645,200 | A * | 10/1927 | Madden | B25B 27/12 29/223 |
| 4,433,934 | A * | 2/1984 | Cleveland | F16D 3/387 403/328 |
| 2009/0313800 | A1* | 12/2009 | Bentley | B25B 7/02 81/9.3 |

(Continued)

FOREIGN PATENT DOCUMENTS

| | | | | |
|---|---|---|---|---|
| CN | 202020479 U | * | 11/2011 | |
| DE | 3622583 A1 | * | 1/1988 | B25B 7/02 |

(Continued)

*Primary Examiner* — Jermie E Cozart
(74) *Attorney, Agent, or Firm* — Plager Schack LLP; Mark H. Plager; Naomi Mann

(57) ABSTRACT

A system for attaching a PTO yoke to a tractor PTO output shaft comprises gripping a shaft of the PTO yoke using a clamp tool, whereby the clamp tool maintains a slide collar of the PTO yoke in a retracted position with respect to the yoke shaft, such that the yoke shaft is exposed for attachment to the tractor PTO output shaft. The clamp tool may comprise pliers, including plier jaws and plier handles; and a flexible band coupled to the plier jaws.

6 Claims, 3 Drawing Sheets

(56) References Cited

U.S. PATENT DOCUMENTS

2010/0050821 A1* 3/2010 Pullen ................ B25B 27/0042
                        81/186
2015/0158159 A1* 6/2015 Hered ...................... B25B 7/10
                        29/227

FOREIGN PATENT DOCUMENTS

EP     1983217 A1 * 10/2008 ............. B60K 17/28
GB      149972 A * 12/1920 ............. B25B 27/12

* cited by examiner

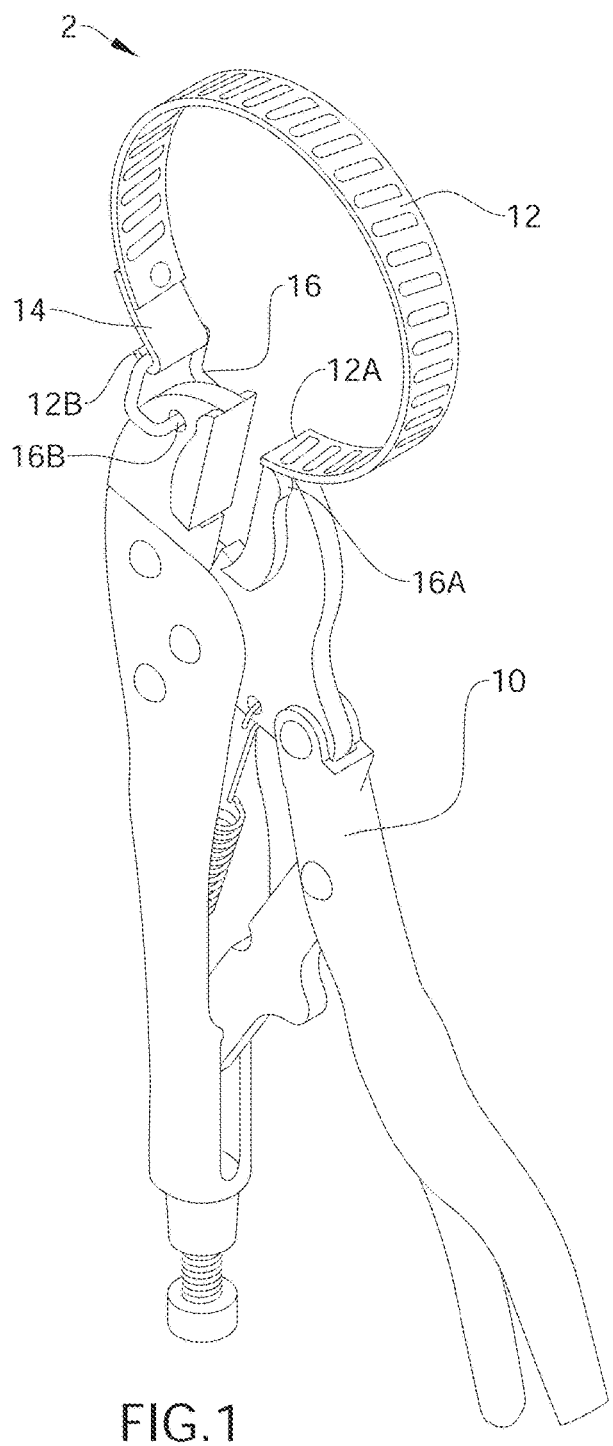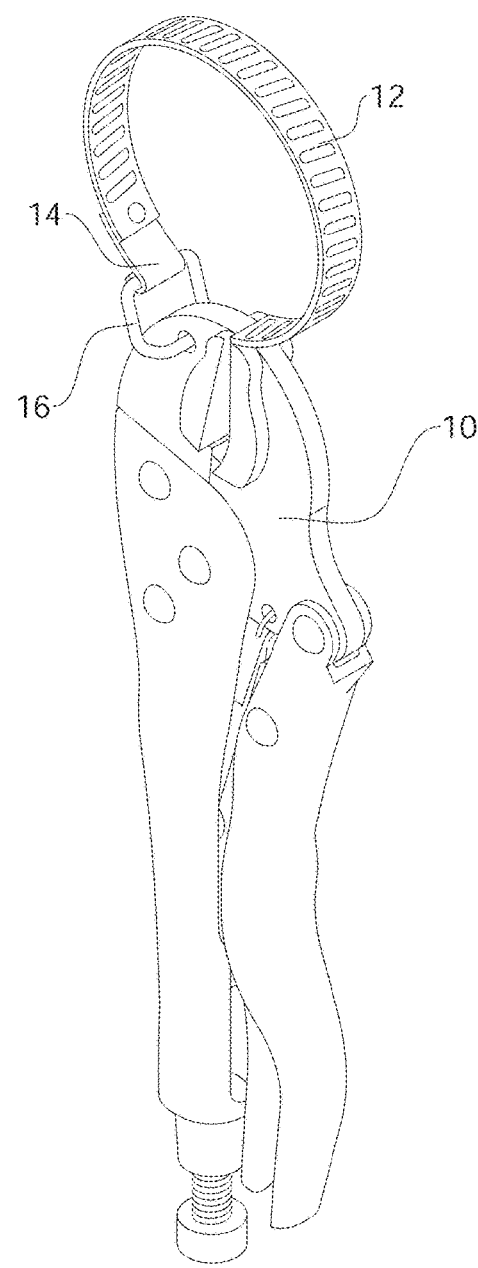
FIG.1
FIG.2

CLAMP TOOL AND METHOD FOR MANIPULATING A SLIDE COLLAR PTO YOKE

RELATED APPLICATION

This application claims benefit to U.S. Application No. 63/657,390 filed Jun. 7, 2024, which is incorporated by reference herein in its entirety.

BACKGROUND

The present disclosure relates generally to improved devices and systems for manipulating a slide collar PTO yoke for connection to a tractor output shaft.

SUMMARY

According to various embodiments, disclosed is a system for attaching a PTO yoke to a tractor PTO output shaft, which may comprise gripping a yoke shaft of the PTO yoke via a clamp tool, whereby the clamp tool maintains a yoke mating slide collar in a retracted position with respect to the yoke shaft, such that the yoke shaft is exposed for attachment to the tractor PTO output shaft. In some embodiments, the clamp tool may comprise pliers, including plier jaws and plier handles; and a flexible band coupled to the plier jaws. In further embodiments, gripping the yoke shaft may comprise pushing the yoke slide collar to the retracted position; wrapping the flexible band around the yoke shaft, whereby a first end of the flexible band is attached to a first jaw of the plier jaws and a second end of the flexible band is attached to a second jaw of the plier jaws; and squeezing the plier handles to tighten the flexible band around the yoke shaft such that the flexible band frictionally grips around the yoke shaft and simultaneously holds the yoke slide collar in the retracted position.

In certain embodiments, the first end of the flexible band is permanently attached to the first jaw of the plier jaws, and the second end of the flexible band is configured for non-permanent attachment to the second jaw of the plier jaws, wherein wrapping the flexible band around the yoke shaft comprises attaching the second end of the flexible band to the second jaw. In some embodiments, the second end of the flexible band includes a clasp, and the second jaw of the plier jaws includes a connector component configured for non-permanent attachment to the clasp. In further embodiments, the connector component in the second jaw comprises a square or rectangular wire bail which is looped through a hole in the second jaw. In certain embodiments, the flexible band comprises a thin metal strap. In some embodiments, the pliers are adjustable locking pliers. In certain embodiments, the method further comprises rotating the yoke shaft to align splines in the PTO yoke with splines in the tractor PTO output shaft while maintaining a squeezing grip on the plier handles.

BRIEF DESCRIPTION OF THE FIGURES

The detailed description of some embodiments of the invention will be made below with reference to the accompanying figures, wherein the figures disclose one or more embodiments of the present invention.

FIG. 1 is a perspective view of a locking ring clamp tool for manipulating a slide collar PTO yoke, according to certain embodiments.

FIG. 2 is a perspective view of the tool shown in a locked position.

DETAILED DESCRIPTION OF CERTAIN EMBODIMENTS

Figure 3:
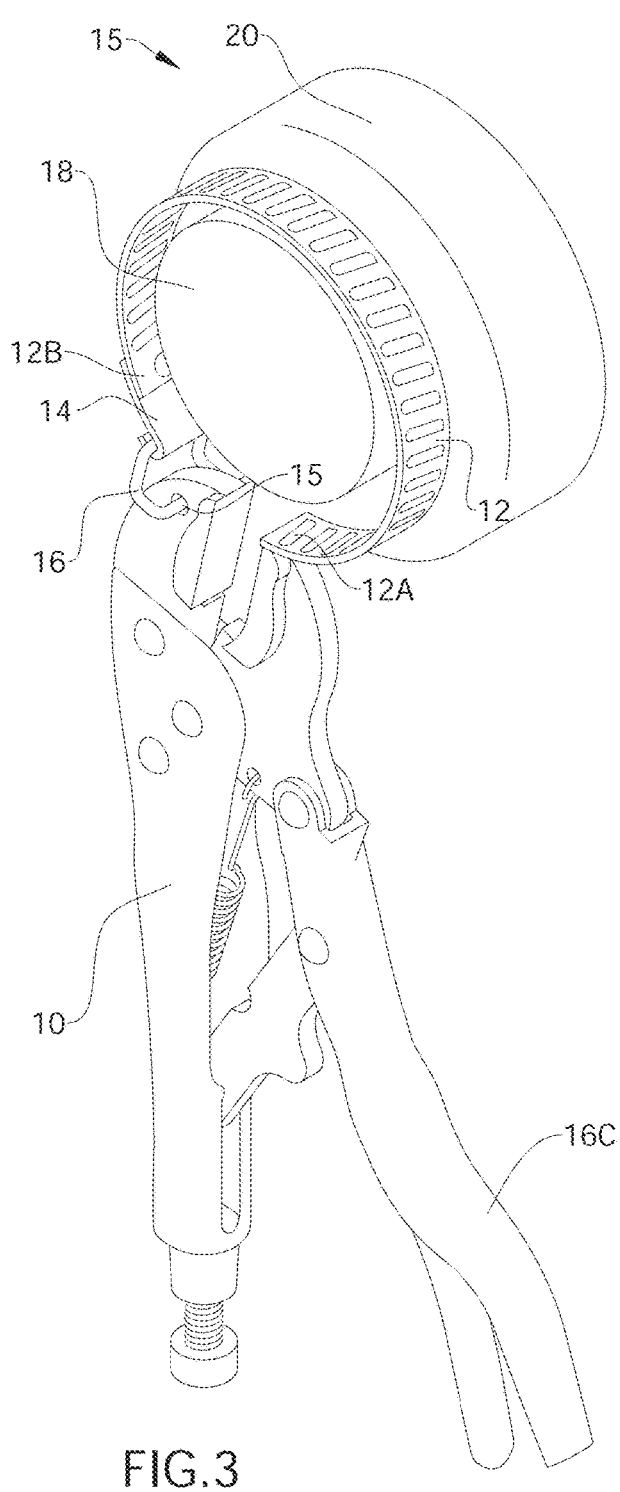
FIG. 3 is a perspective view of the tool shown wrapped around a yoke shaft of the slide collar PTO yoke.
Figure 4:
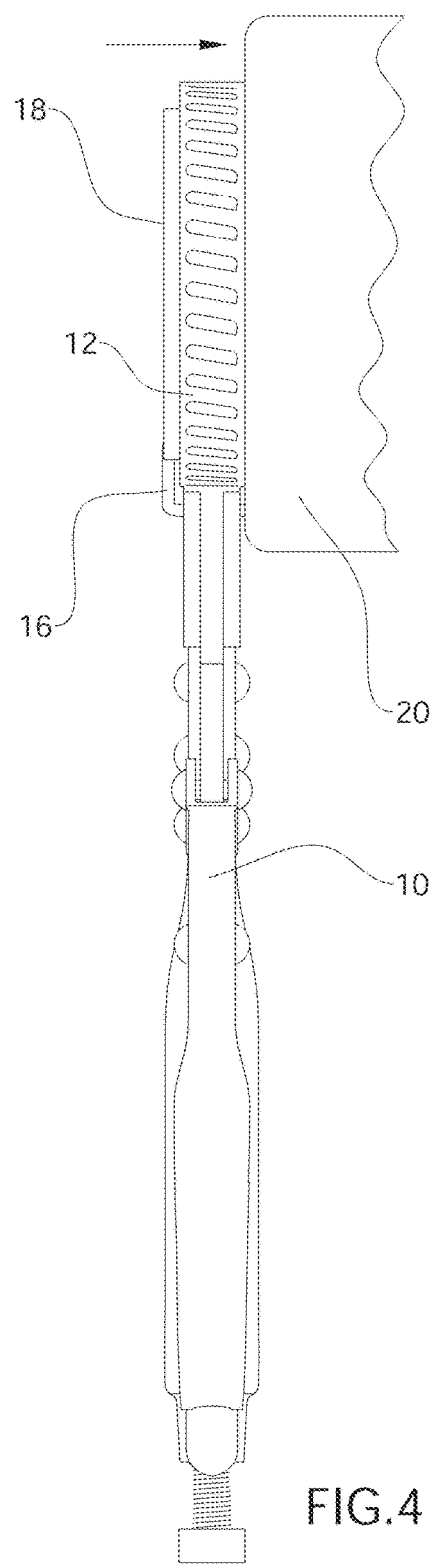
FIG. 4 is a side view of the tool wrapped around the yoke shaft.
Figure 5:
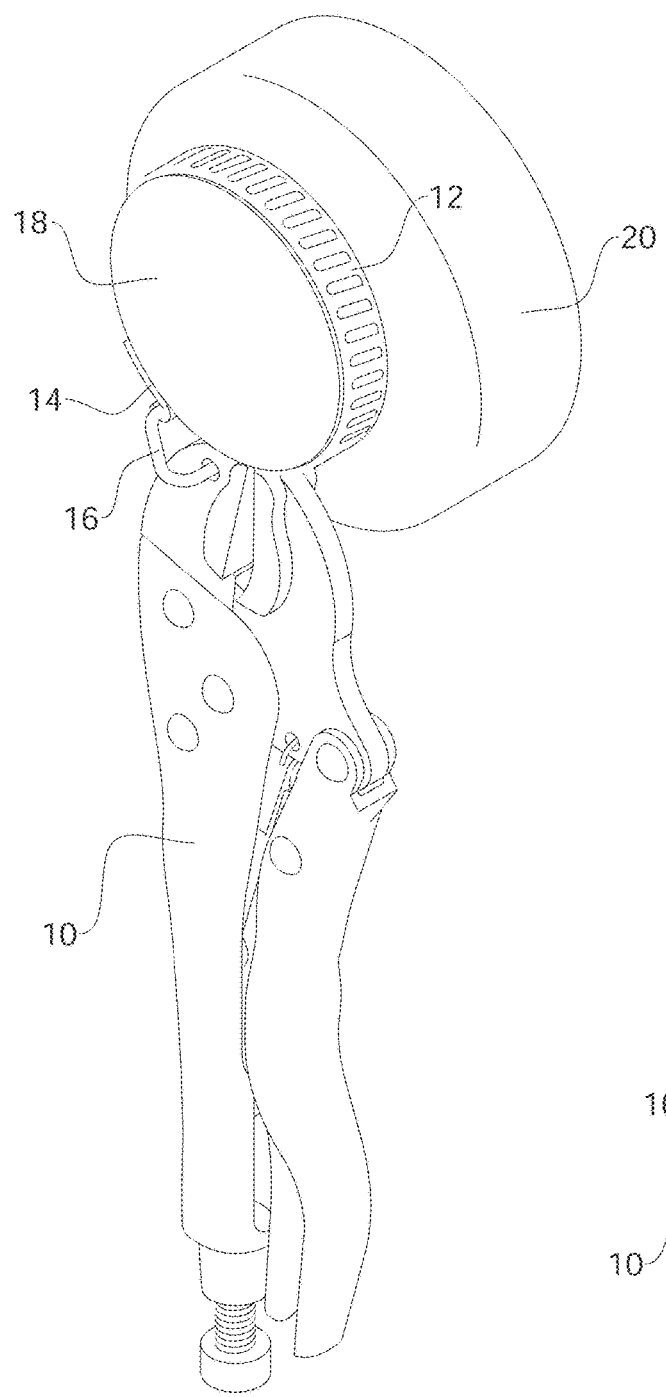
FIG. 5 is a perspective view of the tool tightened around the yoke shaft in gripping engagement.
Figure 6:
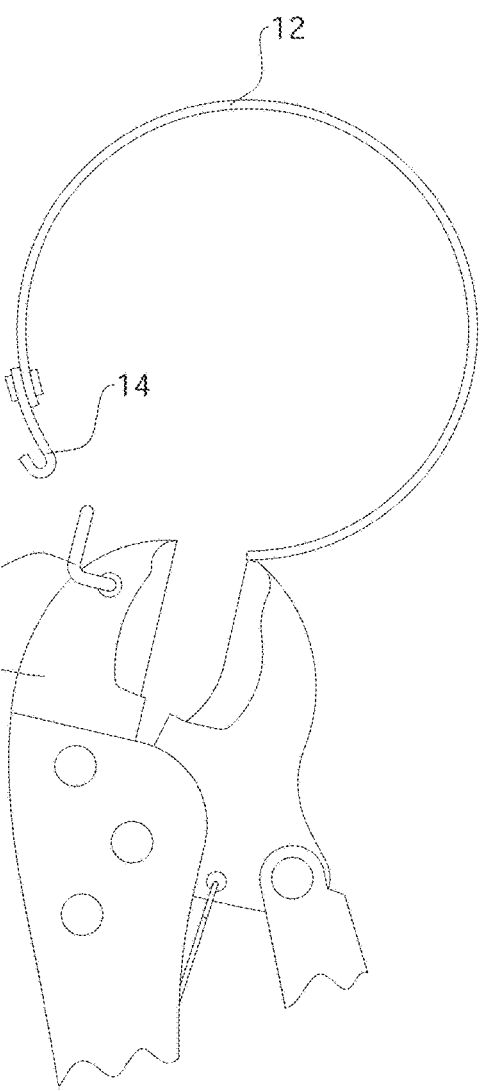
FIG. 6 shows the tool with a second end of the tool's flexible band disengaged from a second plier jaw of the tool.

According to various embodiments, disclosed is an improved system and method for manipulating a slide collar PTO (Power Take Off) yoke 15 for attachment to a tractor PTO output shaft. As is known, PTO yoke 15 may generally comprise a yoke shaft 18 and yoke slide collar 20 which is spring loaded and covers over the yoke shaft (i.e., in an overlapping resting position) absent a retracting force. Typically, slide collar 20 needs to be retracted away from yoke shaft 18 and placed in proper positioning, whereby mating splines in the tractor and yoke shaft are aligned, so that yoke shaft 18 may be engaged with the tractor PTO output shaft (not shown). This can be a difficult and frustrating process. To address this problem, the disclosed system provides a locking ring clamp tool 2 that enables a user to maintain slide collar 20 in a retracted position, while gripping yoke shaft 18 so that it may be aligned and/or manipulated for engagement with the tractor output shaft. In embodiments as depicted in the figures, clamp tool 2 may comprise pliers 10, and a flexible band 12 coupled to the plier jaws. In certain embodiments pliers 10 may be adjustable locking pliers, such as VISE-GRIP® type pliers, but are not limited to this option. In some embodiments, a first end 12A of band 12 may be permanently attached (i.e., welded or otherwise bonded) proximate a top end of a first jaw 16A of pliers 16. A second end 12B of band 12 may include a hook or clasp 14 configured to engage a connector component 14 coupled to a second jaw 16B of the pliers. In certain embodiments, connector component 14 may comprise a square or rectangular wire bail which is looped through a hole in the pliers as shown, but is not limited to this option. Band 12 is sized to encircle and frictionally grip yoke shaft 18 when clasp 14 is engaged with connector component 14, and pliers 16 are squeezed to tighten the plier jaws and/or locked into a closed position as best depicted in FIG. 5. In one example, band 12 may be sized to grip a PTO shaft having a diameter of approximately 6.375 inches. In some embodiments, band 12 may comprise a thin metal strap (e.g., stainless steel of about 5 cm in width, and about 1 mm in thickness) with clasp 14 bolted thereto, but is not limited to this option.

In certain embodiments, clamp tool 2 may be used to maintain slide collar 20 of PTO yoke 15 in retracted position for attachment to a tractor PTO output shaft by wrapping band 12 around yoke shaft 18 with slide collar 20 being in retracted position, whereby the band clasp 14 is engaged to connector component 16 in the pliers. Initially, band 12 fits loosely around shaft 18, and is then tightened around the shaft by gripping and squeezing plier handles 16C to enclose jaws 16A and 16B and/or bring the jaws towards one another. This provides a frictional grip around yoke shaft 18, while maintaining a stop against slide collar 20 to hold it in a retracted position. Thereby, while maintaining a squeezing grip on plier handles 16C, the user may align and position yoke shaft 18/PTO yoke 15 for attachment to the tractor output shaft. In one embodiment, the user may push slide collar 20 back with one hand, place band 12 around yoke shaft 18, place connector component 16 over clasp 14 of the band and grip the plier handles to lock the plier jaws and create tension for holding the collar in a retracted position. Then, yoke shaft 18 may be gently rotated right or left to align the splines for connection.

Hence, the disclosed subject matter provides a simple, quick, and cost effective way for connecting PTO driven implements comprising a slide collar on the yoke, whereby clamp tool 2 may be used with any PTO driven implement. It shall be appreciated that the disclosed system and/or components of the disclosed system may have different configurations in alternate embodiments. For example, band 12 may have different configurations and dimensions, and may further be made of other suitable materials in alternate embodiments. Likewise, connector component 16B and clasp 14 may have different configurations in alternate embodiments.

It shall be appreciated that the components of the disclosed system may comprise any alternative known materials in the field and be of any size and/or dimensions. It shall further be appreciated that the components of the disclosed system may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for attaching a power take off (PTO) yoke to a tractor PTO output shaft, the PTO yoke including a yoke shaft and a yoke slide collar coupled to the yoke shaft, the yoke slide collar being spring loaded and movable from an overlapping resting position to a retracted position with respect to the yoke shaft, the method comprising:
   gripping the yoke shaft via a clamp tool, whereby the clamp tool maintains the yoke slide collar in the retracted position with respect to the yoke shaft, such that the yoke shaft is exposed for attachment to the tractor PTO output shaft,
   wherein the clamp tool comprises: pliers, including plier jaws and plier handles; and a flexible band coupled to the plier jaws,
   wherein gripping the yoke shaft comprises:
      pushing the yoke slide collar to the retracted position,
      wrapping the flexible band around the yoke shaft, whereby a first end of the flexible band is attached to a first jaw of the plier jaws and a second end of the flexible band is attached to a second jaw of the plier jaws, and
      squeezing the plier handles to tighten the flexible band around the yoke shaft such that the flexible band frictionally grips around the yoke shaft and simultaneously holds the yoke slide collar in the retracted position.

2. The method of claim 1, wherein the first end of the flexible band is permanently attached to the first jaw of the plier jaws, and the second end of the flexible band is configured for non-permanent attachment to the second jaw of the plier jaws, wherein wrapping the flexible band around the yoke shaft comprises attaching the second end of the flexible band to the second jaw.

3. The method of claim 2, wherein the second end of the flexible band includes a clasp, and the second jaw of the plier jaws includes a connector component configured for non-permanent attachment to the clasp.

4. The method of claim 3, wherein the connector component in the second jaw comprises a square or rectangular wire bail which is looped through a hole in the second jaw.

5. The method of claim 1, wherein the flexible band comprises a thin metal strap.

6. The method of claim 1, wherein the pliers are adjustable locking pliers.

* * * * *